United States Patent
Mishra et al.

(10) Patent No.: US 12,405,946 B1
(45) Date of Patent: Sep. 2, 2025

(54) AUTOMATIC QUERY GENERATION FOR LARGE LANGUAGE MODELS

(71) Applicant: Salesforce, Inc., San Francisco, CA (US)

(72) Inventors: Nachiketa Mishra, San Francisco, CA (US); Siva Kumar Reddy Vayyeti, Solon, OH (US); Ravi Agrawal, Bangalore (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/442,736

(22) Filed: Feb. 15, 2024

(51) Int. Cl.
 *G06F 16/242* (2019.01)
 *G06F 16/2457* (2019.01)
 *G06N 3/0455* (2023.01)

(52) U.S. Cl.
 CPC ...... *G06F 16/243* (2019.01); *G06F 16/24578* (2019.01); *G06N 3/0455* (2023.01)

(58) Field of Classification Search
 None
 See application file for complete search history.

(56) References Cited

U.S. PATENT DOCUMENTS

| | | | | |
|---|---|---|---|---|
| 10,146,923 B2* | 12/2018 | Pitkänen | .......... | G06Q 20/40145 |
| 11,704,307 B2* | 7/2023 | Maheshwari | ....... | G06F 16/2423 |
| | | | | 707/767 |
| 11,836,768 B2* | 12/2023 | McCormick | ....... | G06Q 30/0282 |
| 11,875,360 B2* | 1/2024 | Karani | ................ | H04M 3/5183 |
| 12,106,131 B2* | 10/2024 | Vaishnav | ............. | G06Q 10/067 |
| 2008/0075244 A1* | 3/2008 | Hale | ....................... | G10L 15/26 |
| | | | | 379/88.13 |
| 2014/0095167 A1* | 4/2014 | Lynch | ..................... | G10L 21/10 |
| | | | | 704/270.1 |
| 2018/0068103 A1* | 3/2018 | Pitkänen | .......... | G06Q 20/40145 |
| 2022/0197900 A1* | 6/2022 | Maheshwari | ..... | G06F 16/90324 |
| 2023/0105159 A1* | 4/2023 | McCormick | ....... | G06Q 30/0203 |
| | | | | 705/26.7 |
| 2024/0095748 A1* | 3/2024 | Karani | ............. | H04M 3/42068 |
| 2024/0168780 A1* | 5/2024 | Vaishnav | ................ | G06F 9/453 |
| 2024/0312466 A1* | 9/2024 | Reouveni | ................ | G10L 17/14 |
| 2025/0097168 A1* | 3/2025 | Goldshtein | ............. | G10L 13/00 |

(Continued)

OTHER PUBLICATIONS

Prompt Me Up: Unleashing the Power of Alignments for Multimodal Entity and Relation Extraction (Year: 2023).*

(Continued)

*Primary Examiner* — Kim T Nguyen
(74) *Attorney, Agent, or Firm* — Kwan & Olynick LLP

(57) ABSTRACT

In some embodiments, a method determines a first representation for an entity that received a request. Second representations are searched in a prompt store to retrieve a second representation that is determined to match the first representation. A prompt template for a model is associated with the second representation. The method searches for relevant documents for the request in a knowledge base store and retrieves information from a document that is considered relevant to the request. The information provides context for the request. The method inserts at least a portion of the information into the prompt template to generate a prompt that is based on the context and submits the prompt to the model to receive a response. The method responds to the request using the response.

20 Claims, 7 Drawing Sheets

(56) References Cited

U.S. PATENT DOCUMENTS

| | | | |
|---|---|---|---|
| 2025/0103813 A1* | 3/2025 | Zhang | G06F 40/295 |
| 2025/0103910 A1* | 3/2025 | Turley | G06N 20/00 |
| 2025/0103962 A1* | 3/2025 | Turley | G06N 20/00 |

OTHER PUBLICATIONS

Gwenyth Portillo Wightman, et al., Strength in Numbers Estimating Confidence of Large Language Models by Prompt Agreement, Proceedings of the 3rd Workshop on Trustworthy Natural Language Processing (TrustNLP 2023), pp. 326-362.

\* cited by examiner

AUTOMATIC QUERY GENERATION FOR LARGE LANGUAGE MODELS

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to databases and more specifically to generative artificial intelligence (AI) systems.

BACKGROUND

A model, such as a large language model (LLM), may be used to provide responses to requests from a consumer device that is being used by a user. The content and quality of the responses may depend on the prompts that are input into the model. A customer service agent that is interacting with the user may have a conversation with the user. Then, the customer service agent may manually generate a prompt for the model. However, when multiple customer agents are interacting with the model, the prompts that are provided to the model may be inconsistent, which results in responses that may be different even for multiple users that are experiencing the same issue. The CRM entity may spend a large amount of manual hours to configure prompts that could be used to as input to the large language model with the hope that the responses would be more consistent. However, this development takes a long time and many manual hours.

BRIEF DESCRIPTION OF THE DRAWINGS

The included drawings are for illustrative purposes and serve only to provide examples of possible structures and operations for the disclosed inventive systems, apparatus, methods and computer program products for generative AI query generation. These drawings in no way limit any changes in form and detail that may be made by one skilled in the art without departing from the spirit and scope of the disclosed implementations.

DETAILED DESCRIPTION

System Overview

Figure 1:
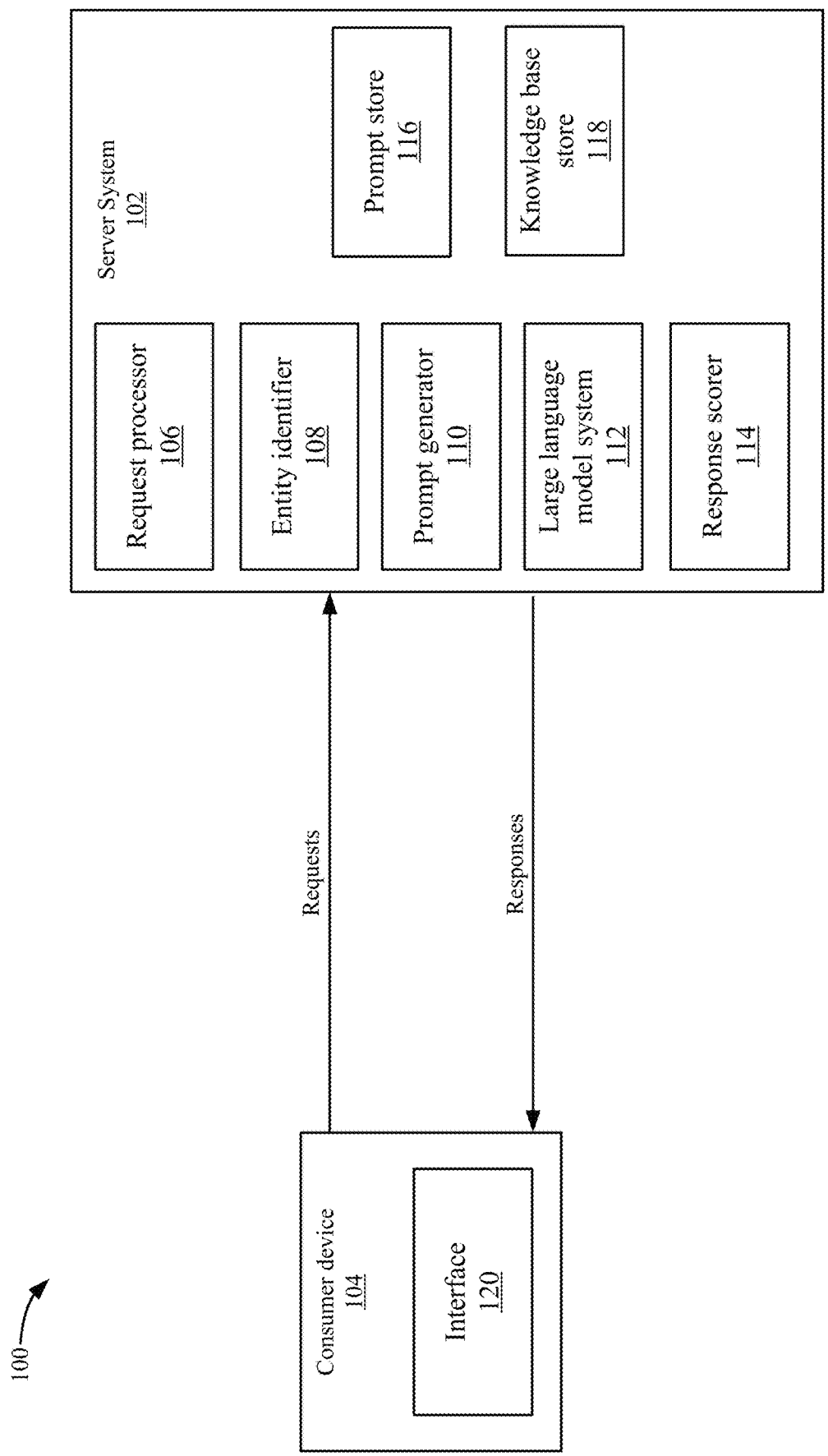
FIG. 1 depicts a simplified system for responding to requests according to some embodiments.

A system may generate responses for requests, such as responses that are in a consistent entity voice. For example, a consumer device may send a request for information. In some examples, a Customer Relationship Management (CRM) entity may want the responses to the request to be written in a consistent entity voice. For example, the entity voice may be a distinct personality that is associated with the CRM entity, and may be used in communications with customers of the entity. To improve the responses, the system may automatically determine prompts for entities for input into a model, such as a large language model. The prompts may be determined based on searching embeddings for an entity that are stored in a prompt store. A prompt template may be selected from the search. The prompt template may include fields in which a context can be inserted. For example, depending on information in the request, different contexts may be inserted.

In some examples, an automated customer service agent may be having a conversation with a user regarding the purchase of a product. The entity would like to return a response in a consistent entity voice. To ensure this occurs, the prompt template that is retrieved should prompt the large language model to return a response in the entity voice. Also, the conversation regarding the purchase may be used to determine the context that is inserted into the prompt template. For example, the system may determine information from the conversation, such as the text of the conversation. The system may then generate an embedding from the conversation. The embedding is then used to search a knowledge base store to determine relevant documents that may be associated with the embedding. For example, embeddings for the document may be used to determine documents that may be relevant to the conversation. In some examples, if the conversation is about a product, documents with information about the product may be retrieved based on a comparison of embeddings between the embedding of the conversation and embeddings of documents. The system may then add the context to the prompt template to form a prompt, and then input the prompt to the large language model. When a response is received from the large language model, the system may generate a score for the response that may rate the quality of the response. If the score meets a threshold, then the system may provide the response to the consumer device. For example, the response may be provided in the conversation with the user. If the score does not meet the threshold, then the response may be verified, such as a reviewer may review the response, edit the response, and then provide the response to the user. The prompt template and score may be stored in a prompt store for future use in processing other requests.

The above process may provide many advantages. For example, the process of generating a prompt and receiving a response may be automated. This may improve the speed of generating a prompt and responding to a request. Also, the use of searching for prompt templates in the prompt store may provide prompt templates that can be used to receive responses that have a consistent entity voice that is desired.

The addition of the context to the prompt templates may also provide a response that is relevant to the request. The use of the score to determine whether the response can be automatically sent to the consumer device also improves the response time compared to manually verifying the response.

System

FIG. 1 depicts a simplified system 100 for responding to requests according to some embodiments. System 100 includes a server system 102 and a consumer device 104. Although single instances of server system 102 and consumer device 104 are shown, multiple instances may be provided. For example, server system 102 may be communicating with multiple consumer devices 104. Also, server system 102 may be implemented on multiple computing devices.

Consumer device 104 may be a client device that is interacting with server system 102. Also, consumer device 104 may be interacting with another system (e.g., another server) that communicates with server system 102. Interface 120 may be a user interface that receives input from a user. In some examples, the user may be sending requests to server system 102. For example, consumer device 104 may be participating in a conversation with a customer service agent, such as a user is having a conversation with the customer service agent to purchase a product, complain about a service, start a return, request more information about a product or service, etc. The customer service agent may be an automated bot that automatically responds to the user, or a human user.

Server system 102 includes a request processor 106 that processes requests from consumer device 104. For example, during a conversation, consumer device 104 may send text, that may include statements, questions, etc. Request processor 106 may process the request and provide a response to the request. In some embodiments, request processor 106 may be implemented using an automated process that is configured to receive text and output responses automatically to consumer device 104.

An entity identifier 108 may determine an entity for the request. For example, a company may be organized in different departments, which may be CRM entities such as marketing, sales, etc. The requests may be received for different entities, such as a sales chat may be performed by the sales department with consumer device 104, or a marketing chat may be performed by the marketing department with consumer device 104.

A prompt generator 110 generates a prompt for a large language model system 112. Large language model system 112 may include a model, such as a large language model, that can receive input and output a response that includes human readable text. Large language model system 112 may include other devices, such as servers that interact with the model. The prompt may include text that is input into the model. The text of the prompt may be used by large language model system 112 to generate a response. Different prompts may generate different responses. The content of the prompt may be used to guide the model when generating the response. For example, the prompt may include requests, questions, statements, etc. In some examples, the prompt may include statements that cause the model to generate a response in an entity voice. For example, a statement in the prompt may state that a typical customer service representative response may be in this entity voice that includes these characteristics. The characteristics that are used may differ for different entities. The model may use the characteristics when generating a response.

As will be described in more detail below, prompt generator 110 may generate the prompt using a prompt store 116 and a knowledge base store 118. Prompt store 116 may include prompt templates that are associated with different entities. The prompt templates may include fields in which a context may be inserted. The context may be determined based on relevant information that is determined for the request from knowledge base store 118. Prompt generator 110 may search prompt store 116 and knowledge base store 118 to retrieve a prompt template and also relevant information. This process will be described in more detail below in FIG. 3.

A response scorer 114 may rate a response that is received from large language model system 112. Response scorer 114 may use different methods to generate the score. Request processor 106 uses the score to determine whether the response can be automatically returned to consumer device 104. For example, if the score meets a threshold, then request processor 106 may automatically return the response to consumer device 104. The automatic response may improve response times compared to if manual prompts are generated. Also, the responses may be in a consistent entity voice. If the score does not meet the threshold, then a verification process may be performed, such as a human user may review the response, edit the response, and then return the response to your consumer device 104.

The following will now describe the training process of the model and then the process to generate a response.

Training

Figure 2:
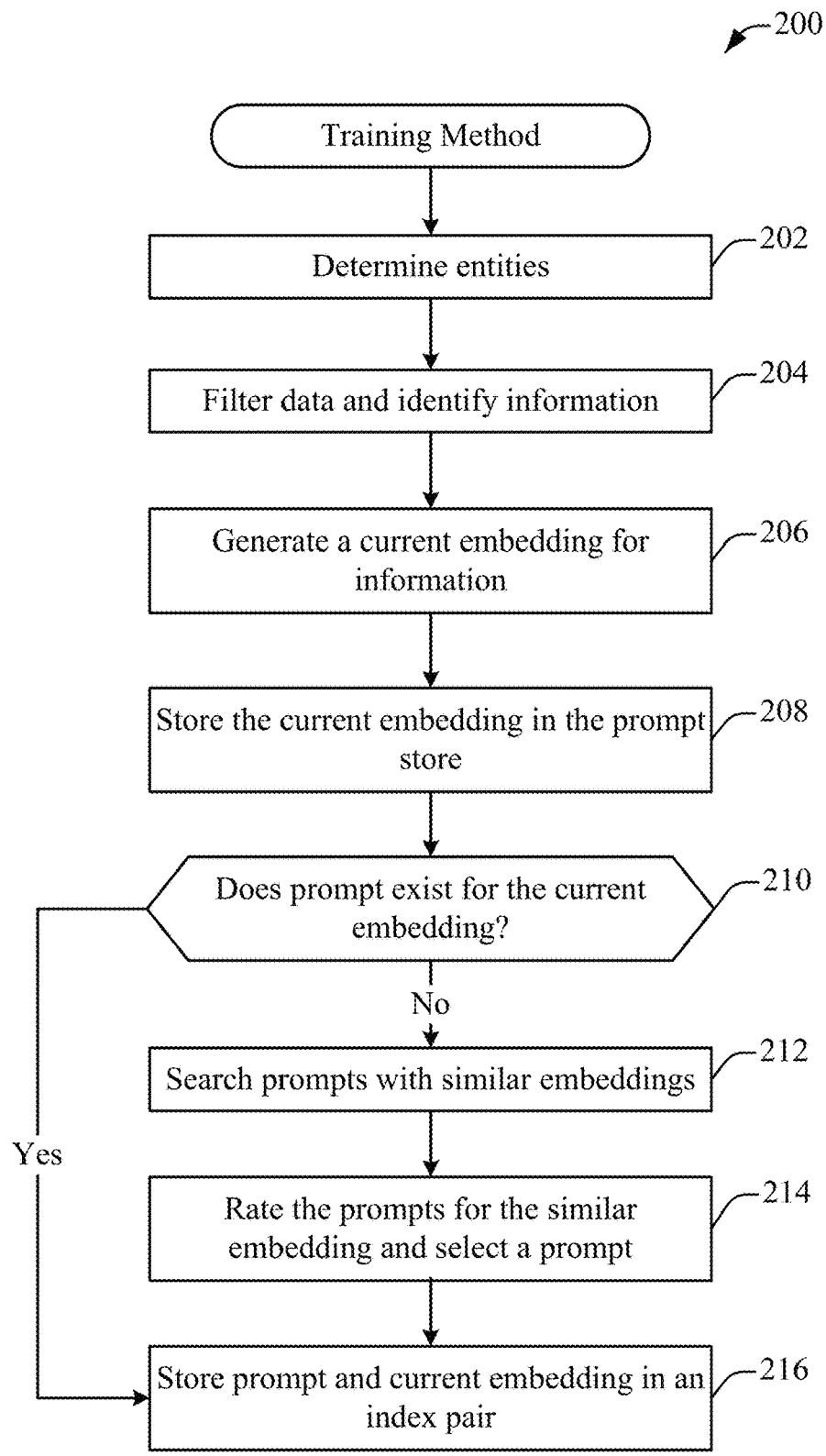
FIG. 2 depicts a simplified flowchart of a method for training a model of a large language model system according to some embodiments.

FIG. 2 depicts a simplified flowchart 200 of a method for training a model of large language model system 112 according to some embodiments. The large language model may be a model that can receive input and generate a response in text that is human like. Although large language models are described, other types of models may be used that can receive text and output a response in text.

At 202, server system 102 determines entities. For example, the entities may include different CRM entities from groups such as marketing, sales, etc. A CRM entity may be associated with a consumer device, such as an entity may be generated for a conversation between a user and a customer service agent.

At 204, server system 102 filters data and identifies information for the entity. There may be many fields in a CRM entity. Server system 102 may filter the fields that contain unstructured text data and use text encoders to identify information or text in the fields. For example, for a voice call entity, the fields may be a phone number, personal information, geo information, reason for the call, and the voice call transcript. Server system 102 may filter out some information, such as a phone number and personal details, and use the reason for the call and the call transcript that has text data about the call. Then, server system 102 may use a text encoder to identify relevant information from these two fields.

At 206, server system 102 generates a representation, such as a current embedding, for the information. An embedding may be a representation of information in a space, such as a lower dimensional space compared to the information for the entity. Using embeddings may provide a faster way of comparing two items. For example, words or sentences may be represented in a vector space. The embeddings may capture the overall meaning or context of the information. At 208, server system 102 stores the current embedding in prompt store 116.

At 210, server system 102 determines if a prompt template exists for the current embedding, such as based on a distance between the embeddings. For example, the embeddings in prompt store 116 may be stored in an index pair with an embedding and a prompt template as a pair. If the same embedding exists, the prompt template for that embedding may be used for the current embedding. For example, if the value of the current embedding is the same as the value for another embedding, the prompt template for the other embedding may be used. Also, a threshold may be used to determine that the prompt template exists for the current embedding. The threshold may be smaller than the threshold used at 212.

If a prompt template does not exist for the embedding, at 212, server system 102 searches prompt templates with similar embeddings, such as based on a distance between the embeddings. For example, server system 102 may apply a threshold that determines embeddings that are within the threshold to the current embedding. This threshold may be larger than the threshold above at 210 to find additional prompt templates that may be similar.

At 214, server system 102 rates the prompt templates from the similar embeddings and selects a prompt template. The rating may be performed in different ways. For example, the prompt templates may be input into a model that outputs a score for each prompt template based on the information that was identified. Also, a human user may rate the prompt templates to determine the scores. The prompt template with the highest score may be selected for the current embedding. Also, edits to the prompt template that is selected may be performed by a human user or automatically based on some differences between the similar embedding and the current embedding.

At 216, if a prompt template exists for the current embedding or if the prompt template from a similar embedding is determined, server system 102 stores the prompt template with the current embedding in an index pair in prompt store 116.

Figure 3:
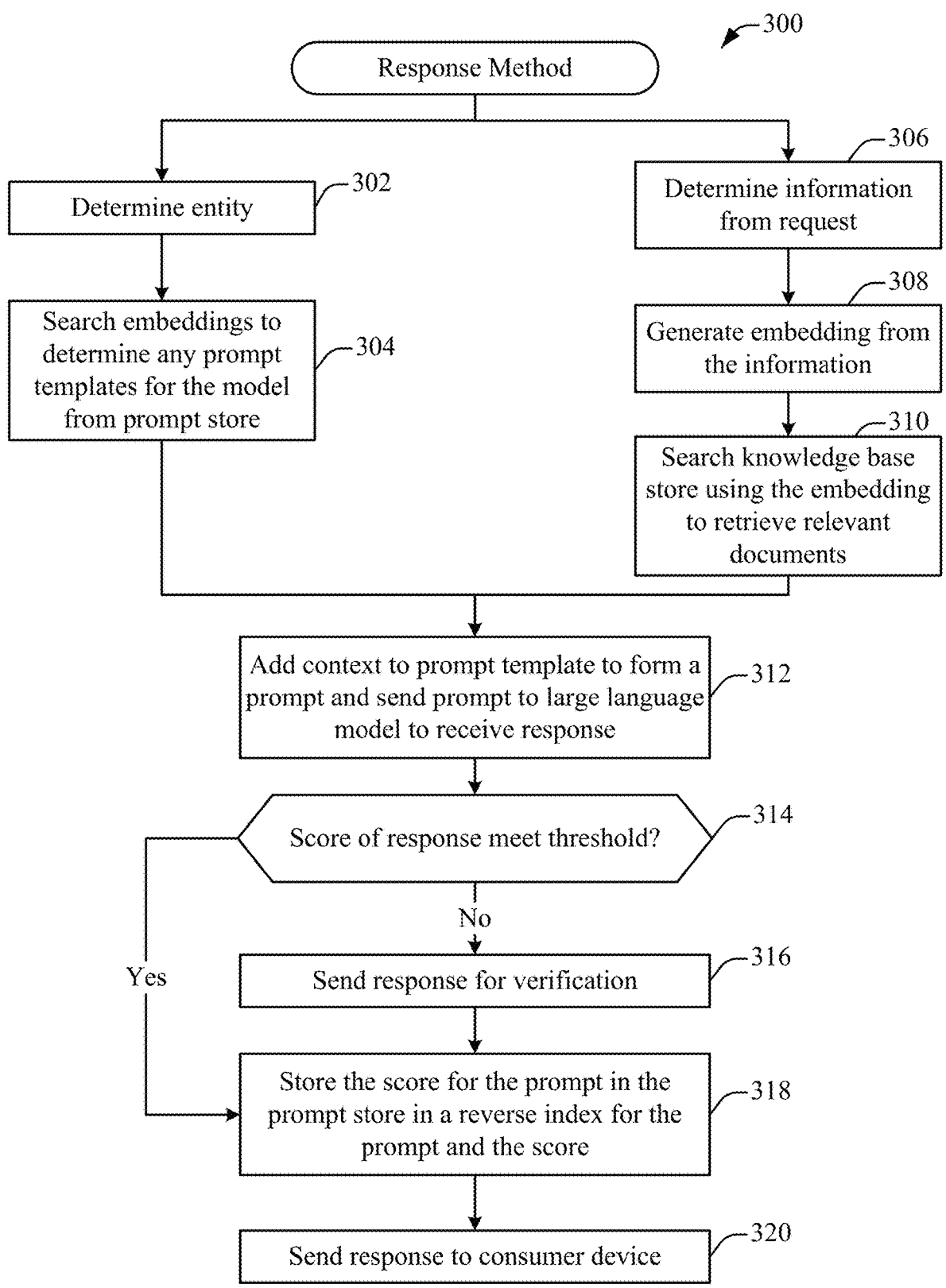
FIG. 3 depicts a simplified flowchart of a method for generating responses according to some embodiments.

The prompt templates in prompt store 116 may then be used to determine a response as described in FIG. 3.

Response

FIG. 3 depicts a simplified flowchart 300 of a method for generating responses according to some embodiments. Request processor 106 may receive a request from consumer device 104. For example, the request may be from a conversation that is being participated in between a user of consumer device 104 and a customer service agent, which may be an automated bot. At 302, entity identifier 108 determines an entity. The information from the request may be used to determine an entity. For example, if the request is received at a customer service representative in the marketing entity, entity identifier 108 determines a CRM entity in the sales entity, such as a CRM entity for a conversation about a product. In another example, a service cloud user who emails support about an issue may be assigned to a case entity.

At 304, prompt generator 110 searches embeddings to determine any prompt templates for the large language model from prompt store 116, such as based on a distance between the embeddings. The embeddings may be vectors that are stored in a vector database. For each vector, there is an associated prompt template. Prompt store 116 provides an interface, such as an application programming interface (API), that will take the embedding as input and return matches (e.g., full or partial matches) with existing embeddings and their corresponding prompt templates. A full match may be an exact match of the embedding, and a partial match may be an embedding that is within a threshold distance to the embedding. If multiple prompt templates are received, prompt generator 110 may select one of the prompt templates based on the request, such as a prompt template that includes fields that optimally fit the CRM entity. Also, prompt generator 110 may use multiple prompt templates. A single prompt template will be described, but the process may be performed using multiple prompt templates. The prompt template that is retrieved from prompt store 116 may be a prompt template that is associated with the determined entity. The prompt template may include text that may be based on the entity voice that is desired and designed to provide a response from the model that is in the entity voice. The prompt template may also have fields in which a context may be inserted where the context is associated with the request that is received.

At 306, prompt generator 110 determines information from the request. For example, text from the request may be determined, such as a conversation between a user of consumer device 104 and a customer service agent.

At 308, prompt generator 110 may generate an embedding from the information. For example, prompt generator 110 generates an embedding from the text of the conversation. The text may include the entire conversation within a time period (e.g., the current session, last x seconds, minutes, etc.), a portion of the conversation, a question from the conversation, etc. At 310, prompt generator 110 searches knowledge base store 118 using the embedding to retrieve relevant information from relevant documents. A document may be any type of information that is stored, such as files, web pages, etc. The relevant documents may be relevant information based on the context of the request. For example, if the request is about a product, prompt generator 110 may retrieve relevant documents on the product based on the embedding. For example, the relevant documents may have an embedding that is similar to the embedding generated from the information from the request. For example, documents may be retrieved and ranked by a relevance score to determine which documents to use.

At 312, prompt generator 110 adds the context from the relevant documents to the prompt template to form a prompt, and sends the prompt to the large language model system 112 to receive a response. For example, the prompt template may have fields in which the context may be inserted, such as a product name or product description. Prompt generator 110 uses the context for the field to determine information from the documents. For example, if the field is for the name of the product, prompt generator 110 determines the name of the product from the documents. Also, if the field is for the product description, prompt generator 110 determines a description of the product from the documents.

Once the response is received, at 314, response scorer 114 generates a score for the response and determines if the score meets a threshold. Response scorer 114 may generate the score using different methods. The score may measure a confidence level that the response is appropriate for the request. In some examples, the score is determined and the threshold for a response on a given prompt is determined based on a desired level that is needed to automatically send the response (e.g., a desired confidence level). If a score does not meet the threshold, then manual verification of the response may be used as described in 316. In other embodiments, response scorer 114 may determine similar prompts to the current prompt. Then, response scorer 114 determines the scores assigned to the similar prompts. The responses of the similar prompts and the current prompt may be compared to determine the score. Then, the score is compared to scores for the other similar prompts. If the score is within a threshold of the scores for the similar prompts, then response scorer 114 may automatically send the response. Also, the response and the request may be input into a model, which then is trained to output a score based on the response and the request.

If the score does not meet the threshold, at 316, the response may be sent for verification. For example, response scorer 114 may output an alert to a human user to verify the response. The human user may verify if the response is appropriate, edit the response, or perform other actions. In another example, the response may be automatically verified and edited.

At 318, if the score the response meets the threshold, or after the response is verified, response scorer 114 stores the prompt template in prompt store 116 in an index, such as an inverted index, for the prompt template and the request. An example of an inverted index may be:

Score 1→Prompt 1, Prompt 5
Score 2→Prompt 2, Prompt 3
Score 6→Prompt 4

Other indexes may also be used, such as a forward index. From the score, the associated prompt templates for the score may be retrieved. The prompt template may be later used for another request that is similar to the current request. For example, the embedding of the current request and a future request may be compared to determine whether to use the prompt template of the current request. Then, at 320, request processor 106 sends a response to consumer device 104.

Example

In some examples, the user may be having a conversation with a customer service agent. The user may be asking about a product. The customer service agent may respond to the user. At some point, the customer service agent wants to leverage the model to generate a response (e.g., the use of the model may be triggered automatically or manually). For example, the customer service agent may want to provide a response about the product that is in the voice of the entity. The above process may be performed to generate the prompt and receive the response in a faster manner compared to manually generating a prompt. Then, the customer service agent may send the response to the user. The response may be in the voice of the entity. This provides a consistent customer voice for the entity over multiple communications by different customer service agents with different consumer devices 104.

Figure 4:
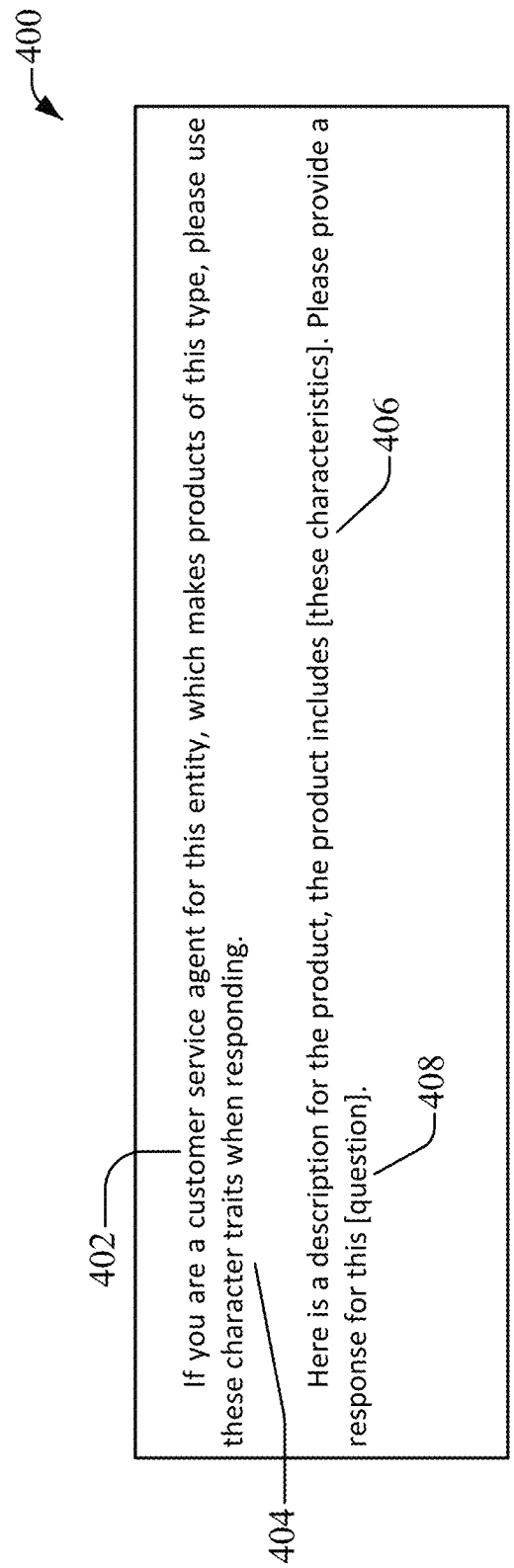
FIG. 4 depicts an example of a prompt template according to some embodiments.

FIG. 4 depicts an example of a prompt template 400 according to some embodiments. At 402, prompt template 400 may include information regarding the situation, such as a customer service representative for the entity that the model is modeling. The entity also may make certain products of a type. At 404, information to help generate a response in the entity voice is provided. The character traits may be text with a response that is an example of the entity voice.

At 406, a context may be inserted. For example, the description for the product with characteristics may be determined based from the relevant documents that are determined based on the conversation. At 408, a question may be generated based on the conversation, such as the question may be what products are similar to the characteristics. The response may then be generated based on the prompt that is received. The model may use the characteristics in the prompt for the entity voice to formulate a response in a particular voice that is associated with the entity. For example, the model uses the description of how a customer service agent would respond to generate text in a similar voice. The response may be a list of products that are similar to the characteristics, the description is presented in the entity voice.

Conclusion

The above training of the system to generate prompts that may provide a consistent customer voice improves the generation of responses. Also, the generation of responses may be improved by combining prompt templates with context information to generate a prompt for the large language model. The speed of generating the response may be improved by generating prompts automatically. The use of the score may allow the process to become automated and also responses may be determined faster than if a human user would have to generate a prompt to the large language model and then return a response. Using the above process, a response may be returned almost instantaneously to a user of consumer device 104.

Figure 5:
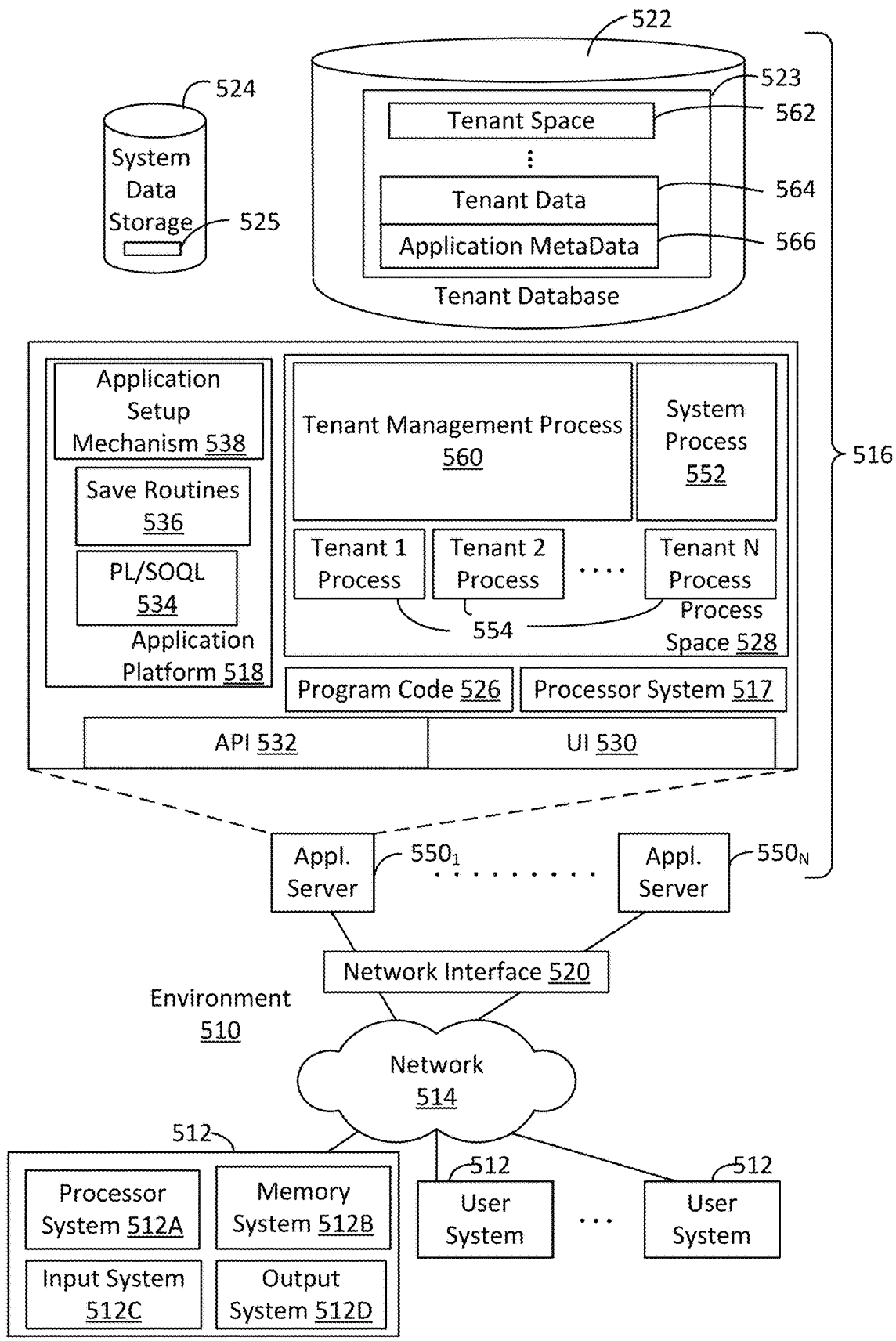
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based AI system. For example, in some implementations, system 516 may include application servers configured to implement and execute prompt generation software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium (s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as an AI system, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
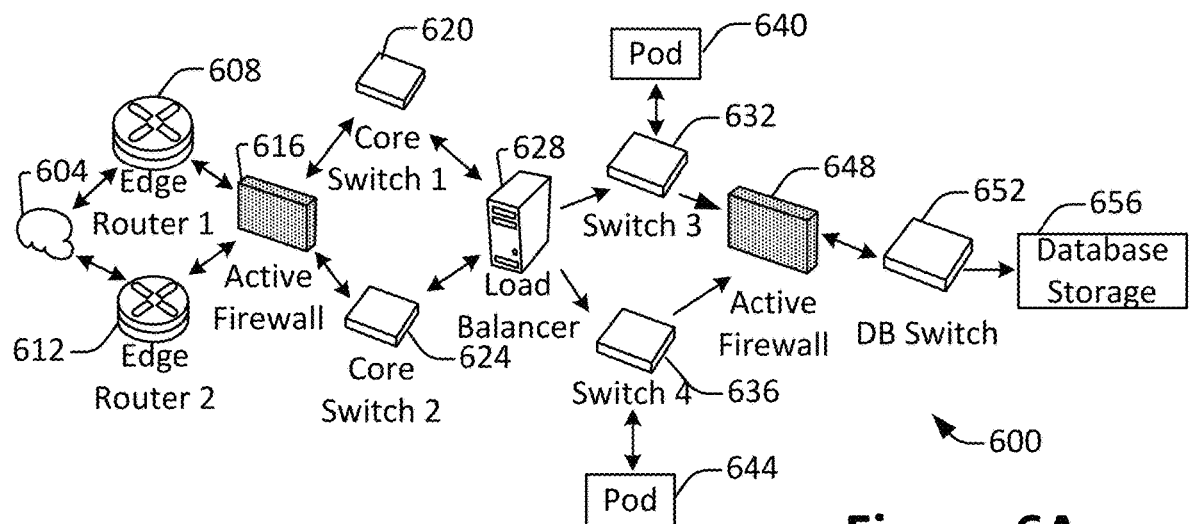
FIG. 6A shows a system diagram of an example of architectural components of an on-demand database service environment, configured in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process request information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
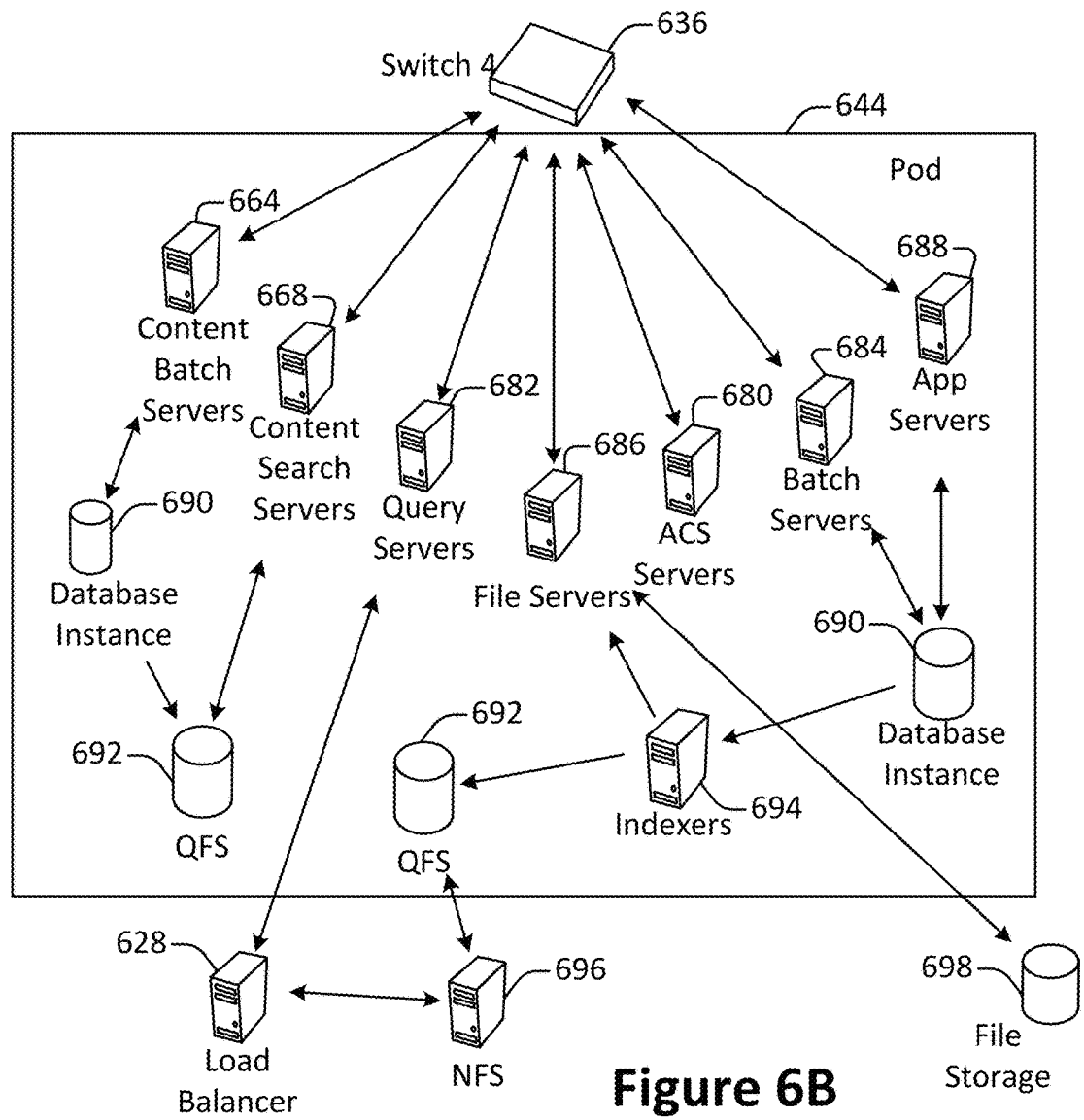
FIG. 6B shows a system diagram further illustrating an example of architectural components of an on-demand database service environment, in accordance with some implementations.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
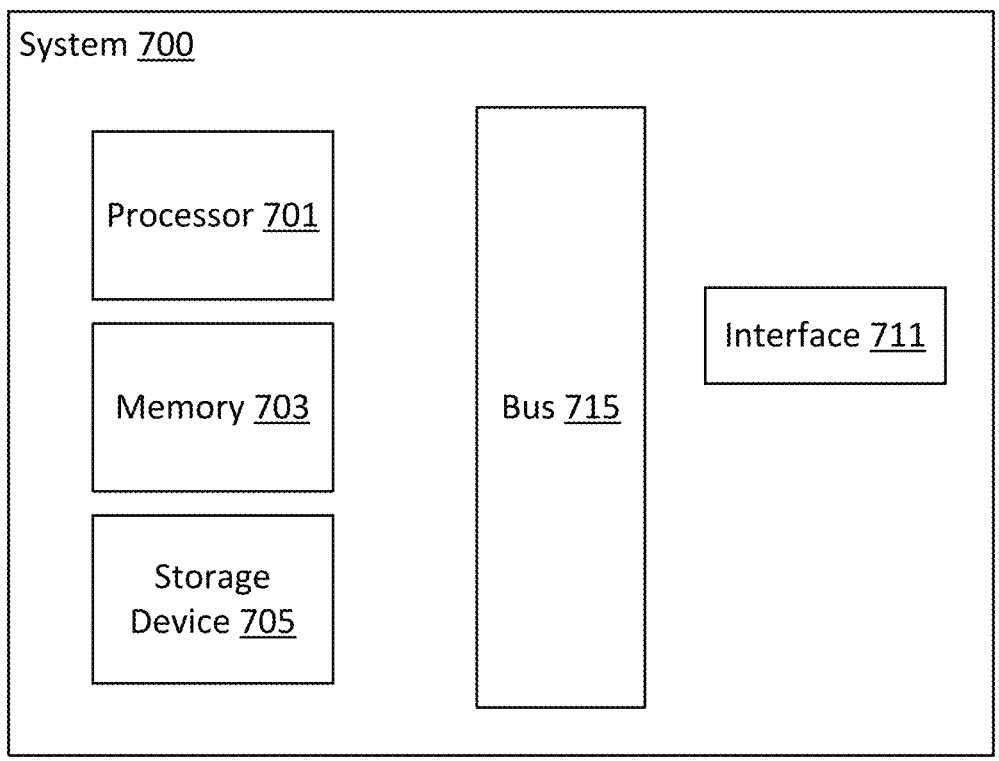
FIG. 7 illustrates one example of a computing device.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
   determining a first representation for an entity that received a request;
   searching second representations in a prompt store to retrieve a second representation that is determined to match the first representation, wherein a prompt template for a model is associated with the second representation, and wherein the prompt template includes information for the entity that is used to cause the response to be in an entity voice for the entity that defines characteristics for a personality that is associated with the entity;
   searching for relevant documents for the request in a knowledge base store;
   retrieving information from a document that is considered relevant to the request, wherein the information provides context for the request;
   inserting at least a portion of the information into the prompt template to generate a prompt that is based on the context;
   submitting the prompt to the model to receive a response, wherein the response is in the entity voice based on providing the information for the entity voice to the model in the prompt; and
   responding to the request using the response.

2. The method of claim 1, wherein searching second representations comprises:
   searching for second representations that are similar to the first representation in a lower dimensional space compared to the request.

3. The method of claim 1, wherein:
   the first representation and the second representations are embeddings in a space, and
   a distance of the second representations to the first representation is used to select the second representation.

4. The method of claim 1, wherein:
   the prompt template includes one or more fields where the information can be inserted.

5. The method of claim 1, wherein searching for relevant documents for the request comprises:
   determining a conversation between a user and an agent for the entity, and
   using text from the conversation to search for the relevant documents.

6. The method of claim 5, wherein the agent is an automated agent that automatically generates responses in the conversation.

7. The method of claim 5, wherein searching for relevant documents for the request comprises:
generating an embedding from the conversation; and
searching embeddings for the relevant documents using the embedding from the conversation to select the document.

8. The method of claim 7, wherein a distance of the embedding from the conversation to an embedding for the document is used to select the document.

9. The method of claim 1, wherein retrieving information from the document comprises:
retrieving information for a field in the prompt from the document based on a type of information that is associated with the field.

10. The method of claim 1, further comprising:
generating a score for the response;
comparing the score to a threshold; and
automatically sending the response to a consumer device that sent the request when the score meets the threshold.

11. The method of claim 10, further comprising:
when the score does not meet the threshold, verifying whether the response should be sent and editing the response before sending the response.

12. The method of claim 1, further comprising:
performing training to generate prompt templates with embeddings that are stored in the prompt store.

13. The method of claim 12, wherein performing training comprises:
generating a current embedding from information for the entity;
searching the prompt store for an embedding that is determined to match with current embedding; and
when an embedding is determined from the prompt store to match the current embedding, storing the current embedding with a prompt template that is associated with the embedding.

14. The method of claim 13, wherein performing training comprises:
when an embedding is not determined from the prompt store to match the current embedding, searching the prompt store for an embedding that is determined to be similar with current embedding but not the same;
rating the embedding to determine if the embedding is similar; and
storing the current embedding with a prompt template that is associated with the embedding when the embedding is determined to be similar.

15. The method of claim 13, wherein performing training comprises:
editing a prompt template for the embedding based on a difference between the embedding and the current embedding to generate a new prompt template, wherein the prompt template that is stored with the current embedding is the new prompt template.

16. The method of claim 1, wherein the characteristics for the personality that are used differ for different entities with different personalities.

17. A non-transitory computer-readable storage medium having stored thereon computer executable instructions, which when executed by a computing device, cause the computing device to be operable for:
determining a first representation for an entity that received a request;
searching second representations in a prompt store to retrieve a second representation that is determined to match the first representation, wherein a prompt template for a model is associated with the second representation, and wherein the prompt template includes information for the entity that is used to cause the response to be in an entity voice for the entity that defines characteristics for a personality that is associated with the entity;
searching for relevant documents for the request in a knowledge base store;
retrieving information from a document that is considered relevant to the request, wherein the information provides context for the request;
inserting at least a portion of the information into the prompt template to generate a prompt that is based on the context;
submitting the prompt to the model to receive a response, wherein the response is in the entity voice based on providing the information for the entity voice to the model in the prompt; and
responding to the request using the response.

18. The non-transitory computer-readable storage medium of claim 17, wherein the prompt template includes information for the entity that is used to cause the response to be in a voice for the entity.

19. The non-transitory computer-readable storage medium of claim 17, wherein searching for relevant documents for the request comprises:
determining a conversation between a user and an agent for the entity, and
using text from the conversation to search for the relevant documents.

20. An apparatus comprising:
one or more computer processors; and
a computer-readable storage medium comprising instructions for controlling the one or more computer processors to be operable for:
determining a first representation for an entity that received a request;
searching second representations in a prompt store to retrieve a second representation that is determined to match the first representation, wherein a prompt template for a model is associated with the second representation, and wherein the prompt template includes information for the entity that is used to cause the response to be in an entity voice for the entity that defines characteristics for a personality that is associated with the entity;
searching for relevant documents for the request in a knowledge base store;
retrieving information from a document that is considered relevant to the request, wherein the information provides context for the request;
inserting at least a portion of the information into the prompt template to generate a prompt that is based on the context;
submitting the prompt to the model to receive a response, wherein the response is in the entity voice based on providing the information for the entity voice to the model in the prompt; and
responding to the request using the response.

* * * * *